US009005068B2

(12) United States Patent
Urabe

(10) Patent No.: US 9,005,068 B2
(45) Date of Patent: Apr. 14, 2015

(54) CONTINUOUSLY VARIABLE BICYCLE TRANSMISSION MECHANISM AND BICYCLE HUB

(71) Applicant: Shimano Inc., Sakai, Osaka (JP)

(72) Inventor: Hiroyuki Urabe, Osaka (JP)

(73) Assignee: Shimano Inc., Osaka (JP)

( * ) Notice: Subject to any disclaimer, the term of this patent is extended or adjusted under 35 U.S.C. 154(b) by 136 days.

(21) Appl. No.: 13/724,757

(22) Filed: Dec. 21, 2012

(65) Prior Publication Data

US 2014/0179478 A1 Jun. 26, 2014

(51) Int. Cl.
| F16H 15/40 | (2006.01) |
| F16H 15/50 | (2006.01) |
| F16H 15/20 | (2006.01) |
| B62M 11/04 | (2006.01) |

(52) U.S. Cl.
CPC .............. *F16H 15/503* (2013.01); *F16H 15/20* (2013.01); *B62M 11/04* (2013.01)

(58) Field of Classification Search
USPC .......................... 475/193, 296, 297, 220, 207
See application file for complete search history.

(56) References Cited

U.S. PATENT DOCUMENTS

| 4,680,985 A | 7/1987 | Troester | |
| 4,973,297 A * | 11/1990 | Bergles | 475/289 |
| 5,129,869 A * | 7/1992 | Sagata et al. | 475/193 |
| 5,562,563 A * | 10/1996 | Shoge | 475/298 |
| 5,876,299 A * | 3/1999 | Kim et al. | 475/215 |
| 5,984,820 A | 11/1999 | Wedeniwski | |
| 7,273,433 B1 | 9/2007 | Troester | |
| 7,762,919 B2 | 7/2010 | Smithson et al. | |
| 7,803,077 B1 | 9/2010 | Spaude | |
| 8,047,956 B2 | 11/2011 | Frank | |
| 2008/0227588 A1* | 9/2008 | Urabe | 475/297 |
| 2009/0036262 A1* | 2/2009 | Hino | 475/318 |
| 2013/0184115 A1* | 7/2013 | Urabe et al. | 475/193 |

FOREIGN PATENT DOCUMENTS

JP 2012-211639 A 11/2012

* cited by examiner

*Primary Examiner* — Gene Crawford
*Assistant Examiner* — Lillian Nguyen
(74) *Attorney, Agent, or Firm* — Global IP Counselors

(57) ABSTRACT

A continuously variable bicycle transmission mechanism includes a ring roller, at least one conical planetary roller, a sun roller and a carrier. The at least one conical planetary roller is frictionally engaged with the ring roller. The at least one conical planetary roller is rotatable about a rotational axis of a roller axle of the at least one conical planetary roller. The sun roller is frictionally engaged with the at least one conical planetary roller. The carrier rotatably supports both ends of the roller axle of the at least one conical planetary roller. The carrier is movable along an axis with the at least one conical planetary roller.

50 Claims, 9 Drawing Sheets

CONTINUOUSLY VARIABLE BICYCLE TRANSMISSION MECHANISM AND BICYCLE HUB

BACKGROUND

1. Field of the Invention

This invention generally relates to a continuously variable bicycle transmission mechanism. More specifically, the present invention relates to a continuously variable bicycle transmission mechanism with a frictional roller.

2. Background Information

Bicycles are typically provided with a chain drive that includes a rear drive sprocket mounted to a rear hub that is mounted to a rear portion of a frame of a bicycle. Some bicycles are provided with a rear hub that includes an internal gearing mechanism for shift among a plurality of gears to change an output gear ratio from a drive sprocket. This type of rear hub is often called an internally geared hub. Some internally geared hubs are provided with a continuously variable transmission. One example of an internally geared hub having a continuously variable transmission is disclosed in U.S. Pat. No. 7,762,919. In this internally geared hub of this publication, the continuously variable transmission uses spherical speed adjusters that each has a tiltable axis of rotation. The spherical speed adjusters are distributed in a plane about a longitudinal axis of the continuously variable transmission.

SUMMARY

It may be desirable that a continuously variable transmission has a simple mechanism in view of assembly or maintenance of the continuously variable transmission. One aspect presented in this disclosure is to provide a continuously variable bicycle transmission mechanism, which has a simpler mechanism.

In view of the state of the known technology, a continuously variable bicycle transmission mechanism includes a ring roller, at least one conical planetary roller, a sun roller and a carrier. The at least one conical planetary roller is frictionally engaged with the ring roller. The at least one conical planetary roller is rotatable about a rotational axis of a roller axle of the at least one conical planetary roller. The sun roller is frictionally engaged with the at least one conical planetary roller. The carrier rotatably supports both ends of the roller axle of the at least one conical planetary roller. The carrier is movable along an axis with the at least one conical planetary roller.

Other objects, features, aspects and advantages of the present application will become apparent to those skilled in the art from the following detailed description, which, taken in conjunction with the annexed drawings, discloses preferred embodiment.

BRIEF DESCRIPTION OF THE DRAWINGS

Referring now to the attached drawings which form a part of this original disclosure.

DETAILED DESCRIPTION OF EMBODIMENTS

A preferred embodiment will now be explained with reference to the drawings. It will be apparent to those skilled in the art from this disclosure that the following descriptions of the embodiment are provided for illustration only and not for the purpose of limiting the invention as defined by the appended claims and their equivalents.

Figure 1:
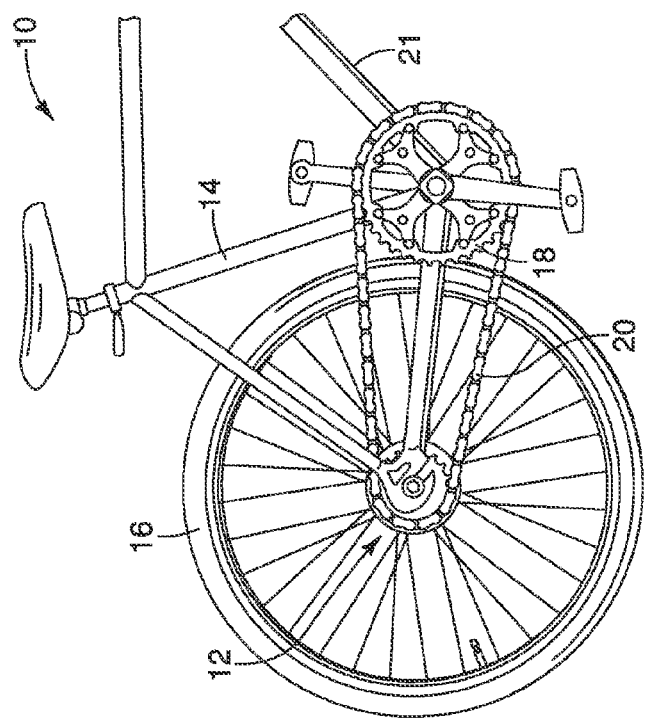
FIG. 1 is a side elevational view of a part of a bicycle with a hub assembly having a continuously variable transmission unit in accordance with one embodiment.

Referring initially to FIG. 1, a part of a bicycle 10 is illustrated that is equipped with a hub assembly 12 (e.g., a bicycle hub) in accordance with one embodiment. As illustrated in FIG. 1, the part of the bicycle 10 further includes a frame 14, a rear wheel 16, a front chain sprocket 18, and a chain 20. Although not shown, the part of the bicycle 10 also includes a handlebar with a conventional gear shifter mounted thereon. The conventional gear shifter is further connected to a Bowden type cable 21 (e.g., a control cable) for operating the hub assembly 12 to change through effective gear ratios between maximum and minimum values, as described in greater detail below. The rear wheel 16 is rotatably supported by the hub assembly 12 on the frame 14. The front chain sprocket 18 is configured to receive rotational power from a cyclists pedaling action. The chain 20 is configured to transmit the rotational power from the front chain sprocket 18 to the hub assembly 12 in a conventional manner to rotate the rear wheel 16 relative to the frame 14. In the illustrated embodiment, the hub assembly 12 has an overlock-nut distance of 135 mm, which is measured between outside faces of locknuts where they contact with the frame 14. However, the hub assembly 12 can be a hub assembly with a different dimension.

Figure 2:
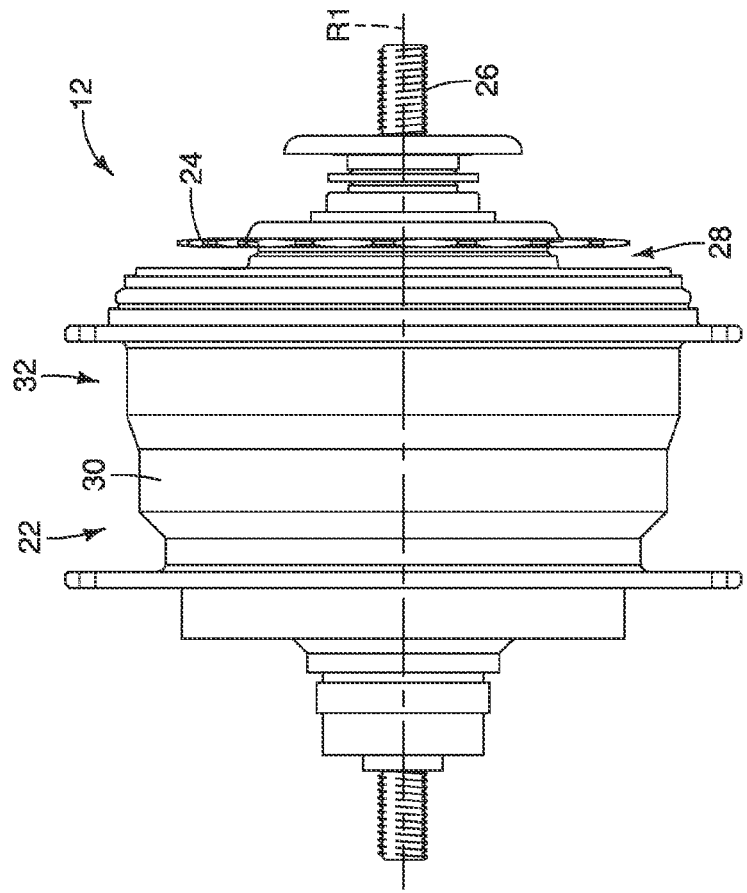
FIG. 2 is a front elevational view of the hub assembly having the continuously variable transmission unit illustrated in FIG. 1.

As illustrated in FIG. 2, the hub assembly 12 basically includes a continuously variable transmission unit 22 (e.g., a continuously variable transmission mechanism or a continuously variable bicycle transmission mechanism) (hereinafter "CVT unit 22"). The hub assembly 12 also includes a rear chain sprocket 24 and a stationary hub shaft 26 (e.g., a hub shaft). Furthermore, the hub assembly 12 includes a driver 28 and a hub shell 30. The rear chain sprocket 24 and the driver 28 are examples of a drive member, and the hub shell 30 is an example of a driven member. Moreover, the hub assembly 12 includes an upstream planetary gear unit 32 (e.g., a planetary gear mechanism). In the illustrated embodiment, the CVT unit 22 is operatively disposed in a power transmission path defined between the rear chain sprocket 24 and the hub shell 30. The upstream planetary gear unit 32 is operatively disposed in the power transmission path between the rear chain sprocket 24 and the hub shell 30.

Figure 3:
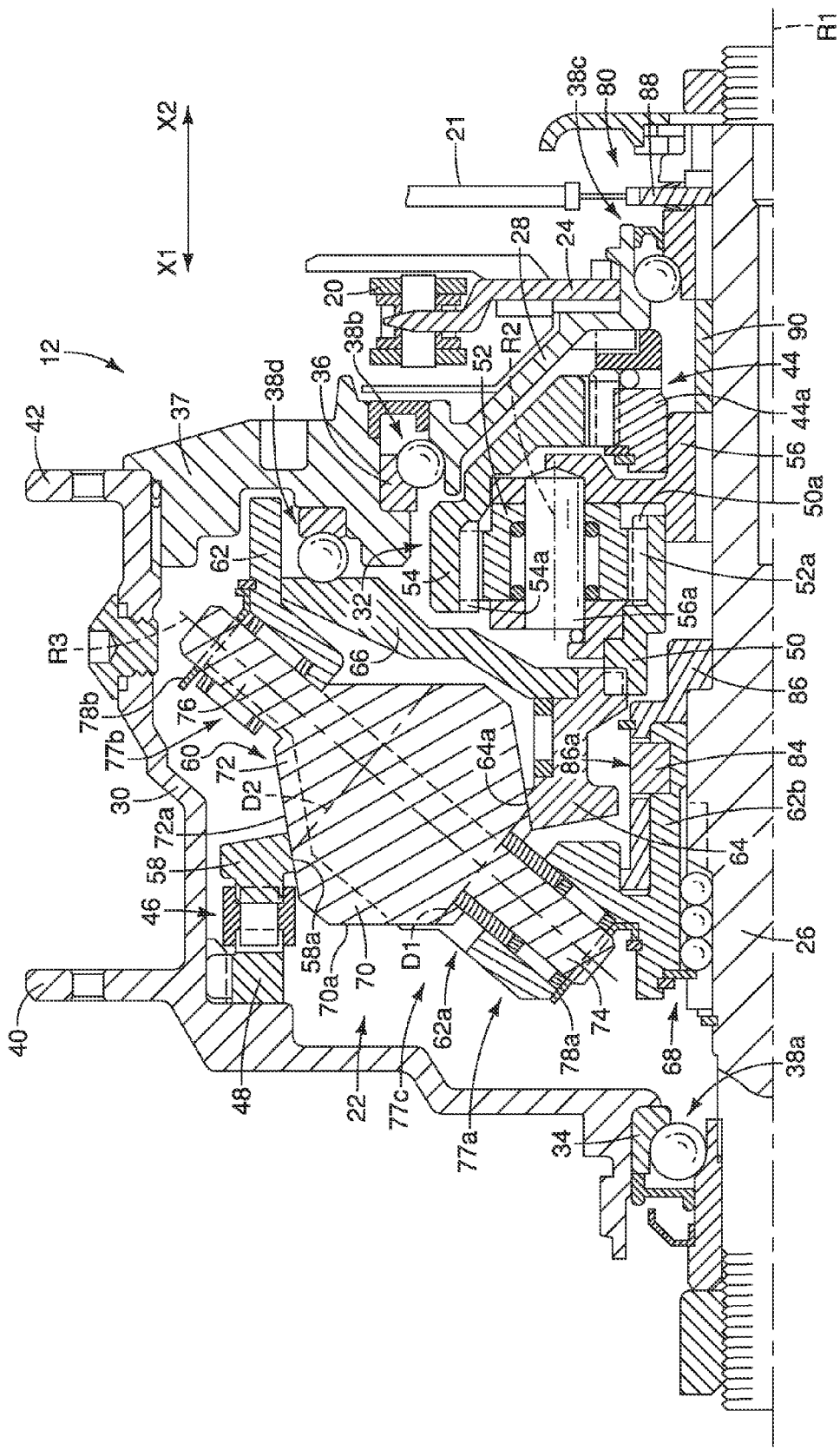
FIG. 3 is a cross sectional view of a upper half of the hub assembly having the continuously variable transmission unit illustrated in FIG. 2, illustrating a roller carrier of the continuously variable transmission unit axially positioned at a top gear position to establish a top gear ratio of the hub assembly.
Figure 4:
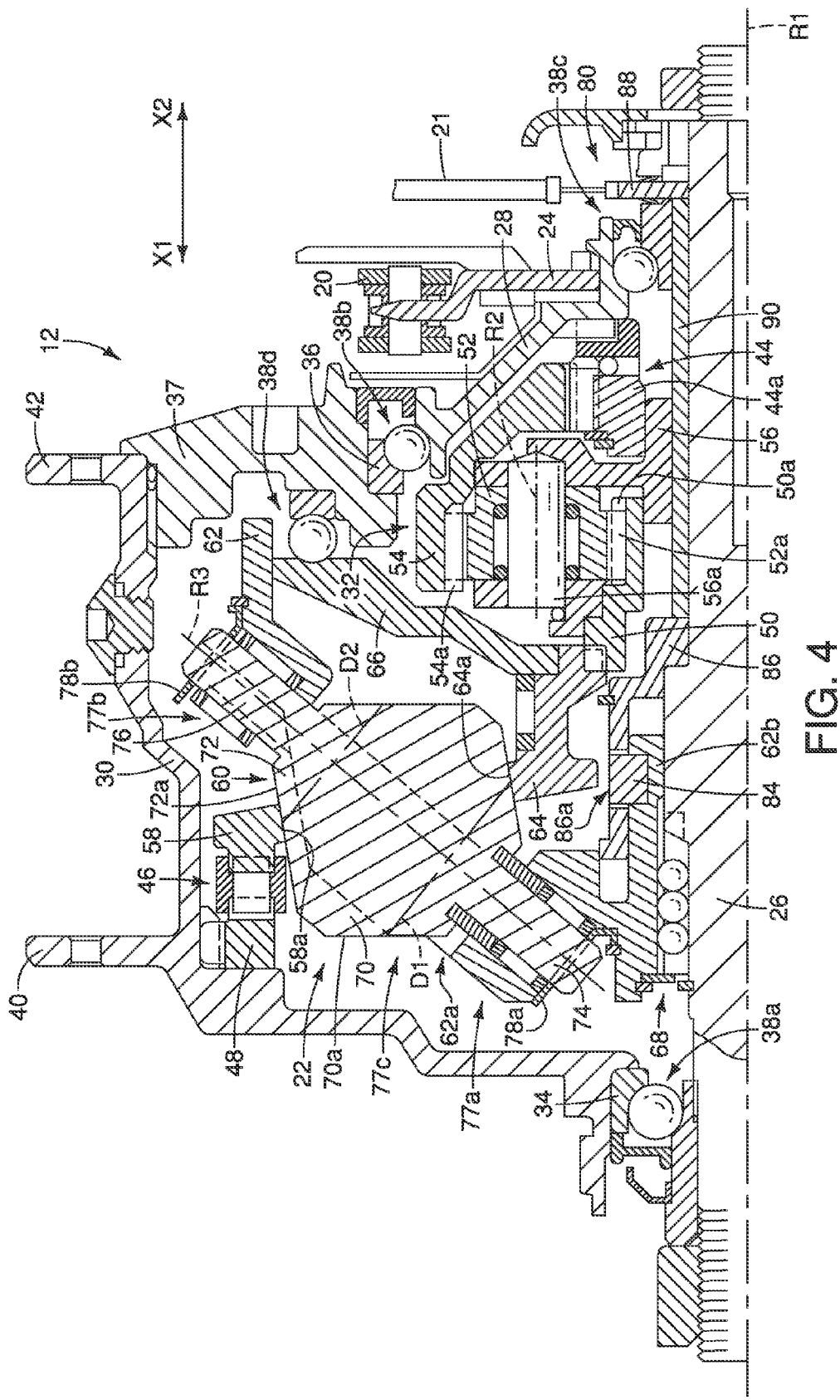
FIG. 4 is a cross sectional view of the upper half of the hub assembly having the continuously variable transmission unit illustrated in FIG. 2, illustrating the roller carrier of the continuously variable transmission unit axially positioned at a middle gear position to establish a middle gear ratio of the hub assembly.
Figure 5:
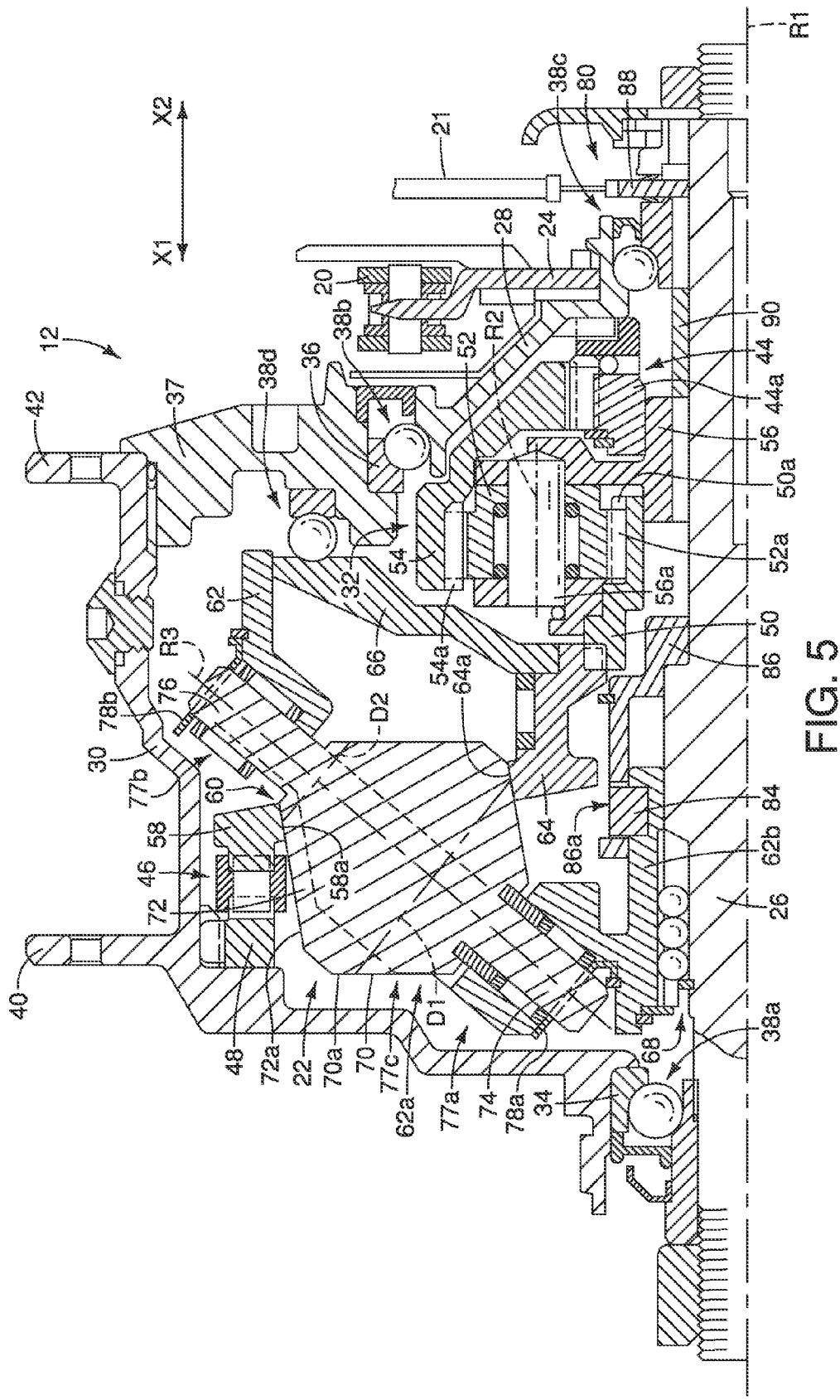
FIG. 5 is a cross sectional view of the upper half of the hub assembly having the continuously variable transmission unit illustrated in FIG. 2, illustrating the roller carrier of the continuously variable transmission unit axially positioned at a low gear position to establish a low gear ratio of the hub assembly.

As illustrated in FIGS. 3 to 5, the rear chain sprocket 24 is rotatably supported to the hub shaft 26. The rear chain sprocket 24 is configured to receive the rotational power from the front chain sprocket 18 via the chain 20. The hub shaft 26 is non-rotatably coupled to the frame 14 in a conventional manner. The hub shaft 26 has a center axis R1 (e.g., a hub axis or an axis) that defines a rotational axis of the hub assembly 12 and the rear wheel 16. The hub shell 30 is rotatably supported about the hub shaft 26 by a left cup 34, a right cup 36, a side plate 37, and a plurality of (four in the illustrated embodiment) bearing assemblies 38a, 38b, 38c and 38d. The hub shell 30 defines an internal space of the hub assembly 12. The hub shell 30 further includes spoke flanges 40 and 42. The spoke flanges 40 and 42 are configured to support spokes and an outer wheel rim of the rear wheel 16 in a conventional manner. The left cup 34 is rotatably supported relative to the hub shaft 26 by the bearing assembly 38a that is radially disposed between the left cup 34 and the hub shaft 26. The right cup 36 is fixedly coupled to the left cup 34 via the hub shell 30 and the side plate 37. The right cup 36 is press-fitted to an inner peripheral face of the side plate 37. The side plate 37 is fixedly coupled to the hub shell 30 with a spline coupling or any other suitable manner. The right cup 36 is rotatably supported relative to the driver 28 by the bearing assembly 38b that is radially disposed between the right cup 36 and the driver 28. The driver 28 generally has an annular conical shape. The driver 28 is rotatably supported about the hub shaft 26 by the bearing assembly 38c that is radially disposed between the driver 28 and the hub shaft 26. The driver 28 supports the rear chain sprocket 24 that is fixedly attached to the driver 28. Since the rear chain sprocket 24 is non-rotatably attached to the driver 28, the rotational power from the rear chain sprocket 24 is directly transferred to the driver 28.

Hereinafter, a rotational direction in which the rear chain sprocket 24 rotates about the center axis R1 in response to a cyclists forward pedaling action is called a "forward rotational direction" about the center axis R1 (i.e., clockwise direction about the hub assembly 12 in FIG. 1). Furthermore, a rotational direction that is opposite the forward rotational direction is called a "reverse rotational direction" about the center axis R1 (i.e., counterclockwise direction about the hub assembly 12 in FIG. 1). Furthermore, an axial direction in which an extended thumb of a right hand points when the center axis R1 is gripped such that other fingers of the right hand point in the forward rotational direction about the center axis R1 is called a "first axial direction X1" of the center axis R1 of the hub shaft 26 (i.e., leftward direction along the center axis R1 of the hub shaft 26 in FIG. 3). Moreover, an axial direction that is opposite the first axial direction is called a "second axial direction X2" of the center axis R1 of the hub shaft 26 (i.e., rightward direction along the center axis R1 of the hub shaft 26 in FIG. 3).

As illustrated in FIGS. 3 to 5, the CVT unit 22 and the upstream planetary gear unit 32 are disposed within the internal space of the hub shell 30. The CVT unit 22 and the upstream planetary gear unit 32 are operatively disposed in the power transmission path between the driver 28 and the hub shell 30. In particular, the upstream planetary gear unit 32 is operatively disposed upstream in the power transmission path relative to the CVT unit 22. Specifically, the upstream planetary gear unit 32 is operatively disposed between the driver 28 and the CVT unit 22. The CVT unit 22 is operatively disposed between the upstream planetary gear unit 32 and the hub shell 30. With this arrangement, the rotational power from the driver 28 is transmitted to the hub shell 30 via the upstream planetary gear unit 32 and the CVT unit 22 through the power transmission path. In the illustrated embodiment, the hub assembly 12 includes an upstream one-way clutch mechanism 44. The one-way clutch mechanism 44 is disposed in the power transmission path between the driver 28 and the hub shell 30. In particular, the one-way clutch mechanism 44 is disposed in the power transmission path between the driver 28 and the upstream planetary gear unit 32. In the illustrated embodiment, the hub assembly 12 includes a downstream one-way clutch mechanism 46. The one-way clutch mechanism 46 is disposed in the power transmission path between the driver 28 and the hub shell 30. In particular, the one-way clutch mechanism 46 is disposed in the power transmission path between the CVT unit 22 and the hub shell 30. Furthermore, the hub assembly 12 includes an output ring 48 that is fixedly coupled to the hub shell 30, and is disposed between the one-way clutch mechanism 46 and the hub shell 30.

Figure 6:
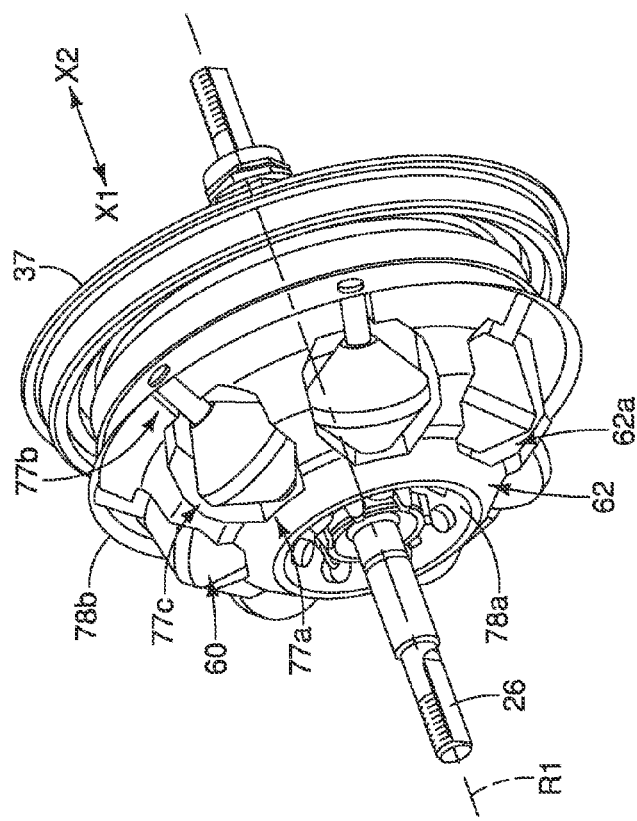
FIG. 6 is a perspective view of a part of the continuously variable transmission unit illustrated in FIG. 3, with the continuously variable transmission unit assembled on a hub shaft of the hub assembly.
Figure 7:
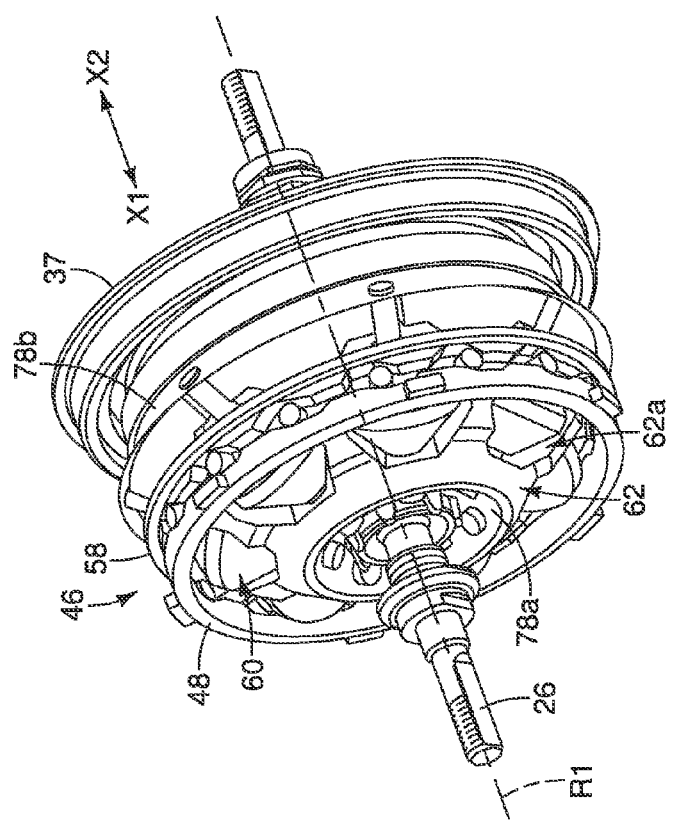
FIG. 7 is a perspective view of a part of the continuously variable transmission unit illustrated in FIG. 3, with a ring gear, a one-way clutch mechanism and an output plate removed from the continuously variable transmission unit illustrated in FIG. 6.

In the illustrated embodiment, the upstream planetary gear unit 32 basically includes an upstream sun gear 50 (e.g., a sun gear), a plurality of upstream planetary gears 52 (e.g., planetary gears), an upstream ring gear 54 (e.g., a ring gear) and an upstream planetary gear carrier 56 (e.g., a planetary gear carrier). Specifically, in the illustrated embodiment, the upstream planetary gear unit 32 includes four of the upstream planetary gears 52 (only one is shown in FIG. 3). However, the number of the upstream planetary gears 52 can be changed as needed or desired. In particular, for example, the number of the upstream planetary gears 52 can be less than four (e.g., three), or more than four (e.g., seven). The upstream sun gear 50, the upstream planetary gears 52, the upstream ring gear 54 and the upstream planetary gear carrier 56 are made of metallic material, such as steel, or any other suitable material that is typically used in gear mechanisms. On the other hand, in the illustrated embodiment, the CVT unit 22 basically includes a ring roller 58, a plurality of conical planetary rollers 60 (e.g., at least one conical planetary roller), a roller carrier 62 (e.g., a carrier), and a sun roller 64. Specifically, in the illustrated embodiment, as shown in FIGS. 6 and 7, the CVT unit 22 includes seven of the conical planetary rollers 60 (only one is shown in FIG. 3). However the numbers of the conical planetary rollers 60 can be changed as needed or desired. In particular, for example, the number of the conical planetary rollers 60 can be less than seven (e.g., six) or more than seven (e.g., eight). The ring roller 58, the conical planetary rollers 60, the roller carrier 62 and the sun roller 64 are made of metallic material, such as steel, or any other suitable material that is typically used in friction gear mechanisms.

Referring to FIGS. 3 to 5, the configuration of the upstream planetary gear unit 32 will be discussed in detail. In the illustrated embodiment, the upstream planetary gear unit 32 is operatively disposed between the driver 28 and the sun roller 64 of the CVT unit 22 such that the rotational power (e.g., a driving force) from the driver 28 is transmitted to the sun roller 64 of the CVT unit 22 through the upstream planetary gear unit 32. With the upstream planetary gear unit 32, the upstream planetary gear carrier 56 is held stationary relative to the hub shaft 26. The upstream ring gear 54 receives an input rotation in the forward rotational direction from the driver 28 while the upstream sun gear 50 outputs an output rotation in the reverse rotational direction to the sun roller 64 of the CVT unit 22. In other words, the upstream planetary gear unit 32 reverses the rotational direction of the input rotation from the driver 28. In the illustrated embodiment, the upstream ring gear 54 is operatively coupled to the driver 28 such that the upstream ring gear 54 receives the rotational power from the driver 28. The upstream planetary gears 52 are engaged with the upstream ring gear 54. The upstream planetary gear carrier 56 is non-rotatably supported to the hub shaft 26. The upstream planetary gear carrier 56 rotatably supports the upstream planetary gears 52. The upstream sun gear 50 is operatively coupled to the upstream planetary gears 52 such that the upstream sun gear 50 transmits the rotational power to the sun roller 64 of the CVT unit 22.

More specifically, in the illustrated embodiment, the upstream ring gear 54 is connected to the driver 28 via the one-way clutch mechanism 44. The one-way clutch mechanism 44 is a conventional one-way clutch mechanism, and transmits the rotational power from the driver 28 to the upstream ring gear 54 only in the forward rotational direction about the center axis R1. In the illustrated embodiment, the driver 28 is non-rotatably coupled to an input ring 44a of the one-way clutch mechanism 44 with a spline coupling. The input ring 44a radially faces with an inner peripheral face of the upstream ring gear 54 via rollers. The upstream ring gear 54 generally has an annular shape. The upstream ring gear 54 includes radially inwardly extending gear teeth 54a. The upstream ring gear 54 is rotatable about the hub shaft 26 with the driver 28 in the forward rotational direction about the center axis R1. The upstream planetary gears 52 are rotatably supported to the upstream planetary gear carrier 56. The upstream planetary gear carrier 56 is non-rotatably supported to the hub shaft 26. The upstream planetary gear carrier 56 has a plurality of (four in the illustrated embodiment) rotational axles 56a that are circumferentially arranged on the upstream planetary gear carrier 56 about the hub shaft 26 with equal spacing. The upstream planetary gears 52 are rotatably coupled to the rotational axles 56a of the upstream planetary gear carrier 56, respectively. The rotational axles 56a have center axes that define rotational axes R2 of the upstream planetary gears 52, respectively.

Each of the upstream planetary gears 52 includes radially outwardly extending gear teeth 52a. The gear teeth 52a of the upstream planetary gears 52 mesh with the gear teeth 54a of the upstream ring gear 54 at radially outward locations of the center axis R1 relative to the rotational axes R2, respectively. The upstream sun gear 50 has radially outwardly extending gear teeth 50a. The gear teeth 50a mesh with the gear teeth 52a of the upstream planetary gears 52 at radially inward locations of the center axis R1 relative to the rotational axes R2, respectively. Furthermore, the upstream sun gear 50 is fixedly coupled to an inner peripheral face of the sun roller 64 of the CVT unit 22 in a conventional manner. Specifically, in the illustrated embodiment, splines formed on an outer peripheral surface of the upstream sun gear 50 engage with spline grooves on the inner peripheral face of the sun roller 64. In the illustrated embodiment, each of the upstream planetary gears 52 includes a single gear section. However, the upstream planetary gears 52 can be a different type of gear as needed or desired. Specifically, the upstream planetary gears 52 can include a stepped gear with dual gear sections (i.e., the smaller and larger diameter gear sections). The dual gear sections mesh with the gear teeth 50a of the upstream sun gear 50 and the gear teeth 54a of the upstream ring gear 54, respectively, to increase or decrease rotational speed as needed or desired.

Referring to FIGS. 3 to 8, the configuration of the CVT unit 22 will be discussed in detail. In the illustrated embodiment, the conical planetary rollers 60 are frictionally engaged with the ring roller 58. The conical planetary rollers 60 are rotatable about rotational axes R3 of the conical planetary rollers 60, respectively. The sun roller 64 is frictionally engaged with the conical planetary rollers 60. The roller carrier 62 rotatably supports the conical planetary rollers 60. The roller carrier 62 is slidable along the center axis R1 with the conical planetary roller 60. In the illustrated embodiment, the roller carrier 62 is held non-rotatable relative to the hub shaft 26. The roller carrier 62 is slidable relative to the hub shaft 26 between a first axial position (shown in FIG. 3) and a second axial position (shown in FIG. 5) via a middle axial position (shown in FIG. 4). The first axial position is located at one end of a movable range of the roller carrier 62 in the second axial direction X2, while the second axial position is located at the other end of the movable range of the roller carrier 62 in the first axial direction X1. In other words, the first axial position is axially located in the second axial direction X2 relative to the second axial position. The middle axial position is axially located between the first and second axial position. The sun roller 64 receives an input rotation in the rearward rotational direction from the upstream sun gear 50 of the upstream planetary gear unit 32 while the ring roller 58 outputs an output rotation in the forward rotational direction to the hub shell 30. In other words, the CVT unit 22 reverses the rotational direction of the input rotation from the upstream sun gear 50 of the upstream planetary gear unit 32. In the illustrated embodiment, the driver 28 is operatively coupled to the sun roller 64 such that the rotational power from the driver 28 is transmitted to the conical planetary rollers 60 through the sun roller 64. The hub shell 30 is operatively coupled to the ring roller 58 such that the hub shell 30 receives the rotational power from the conical planetary rollers 60 through the ring roller 58.

More specifically, in the illustrated embodiment, the sun roller 64 is operatively supported to the hub shaft 26. In particular, the sun roller 64 is rotatably supported to the hub shaft 26. The sun roller 64 is operatively coupled to the driver 28 through the one-way clutch mechanism 44 and the upstream planetary gear unit 32. The sun roller 64 is fixedly coupled to the upstream sun gear 50 with the spline coupling or any other suitable manner as needed or desired. The sun roller 64 has a tapered outer peripheral face 64a. The tapered outer peripheral face 64a of the sun roller 64 frictionally engages with the conical planetary rollers 60. The tapered outer peripheral face 64a is configured and arranged such that the outer diameter of the tapered outer peripheral face 64a decreases along the first axial direction X1 of the hub shaft 26. The tapered outer peripheral face 64a has no gear teeth. In the illustrated embodiment, a flange member 66 is fixedly coupled to an axial end portion of the sun roller 64. The flange member 66 radially outwardly extends from the sun roller 64. The flange member 66 is relatively rotatably supported to the side plate 37 by the bearing assembly 38d that is axially disposed between the flange member 66 and the side plate 37. The sun roller 64 and the flange member 66 are axially supported relative to the hub shell 30 and the side plate 37 by the bearing assembly 38d.

Referring further to FIGS. 3 to 5, the configuration of the conical planetary rollers 60 will be discussed in detail. The conical planetary rollers 60 are rotatably supported to the roller carrier 62. The conical planetary rollers 60 frictionally engage with the ring roller 58 and the sun roller 64. The conical planetary rollers 60 are substantially identical to each other. Thus, only one of them (i.e., the conical planetary roller 60 in FIG. 3) will be discussed hereinafter for the sake of brevity. In the illustrated embodiment, the conical planetary roller 60 has first and second frictional engagement portions 70 and 72, and first and second roller axles 74 and 76 (e.g., roller axles). The first and second frictional engagement portions 70 and 72 and the first and second roller axles 74 and 76 are concentrically arranged along the rotational axis R3 defined by the first and second roller axles 74 and 76. The first and second frictional engagement portions 70 and 72 are axially arranged relative to each other at axially spaced locations along the rotational axis R3. The first and second frictional engagement portions 70 and 72 are frictionally engaged with the sun roller 64 and the ring roller 58, respectively. The first roller axle 74 axially extends from an axial end portion of the first frictional engagement portion 70 away from the second frictional engagement portion 72. The second roller axle 76 axially extends from an axial end portion of the second frictional engagement portion 72 away from the first frictional engagement portion 70. In the illustrated embodiment, the conical planetary roller 60 is integrally formed as a one-piece, unitary member. However, the conical planetary roller 60 can be formed by assembling separate parts as needed or desired.

As illustrated in FIGS. 3 to 5, the first frictional engagement portion 70 has a truncated cone shape (i.e., a section of cone or a cone frustum) with a tapered outer peripheral face 70a. The second frictional engagement portion 72 has a truncated cone shape (i.e., a section of cone, or a cone frustum) with a tapered outer peripheral face 72a. The tapered outer peripheral face 70a of the first frictional engagement portion 70 has an outer diameter that gradually increases from a first minimum diameter at the axial end portion of the first frictional engagement portion 70 to a first maximum diameter as axially approaching the second frictional engagement portion 72 along the rotational axis R3. The tapered outer peripheral face 72a of the second frictional engagement portion 72 has an outer diameter that gradually increases from a second minimum diameter at the axial end portion of the second frictional engagement portion 72 to a second maximum diameter as axially approaching the first frictional engagement portion 70 along the rotational axis R3. In the illustrated embodiment, the first maximum diameter of the first frictional engagement portion 70 is substantially equal to the second maximum diameter of the second frictional engagement portion 72. The first and second frictional engagement portions 70 and 72 have no gear teeth. In particular, no gear teeth are formed on the tapered outer peripheral faces 70a and 72a. Furthermore, as illustrated in FIGS. 3 to 5, the first and second frictional engagement portions 70 and 72 are configured such that an top ridge line on the tapered outer peripheral face 72a extends parallel to a bottom ridge line of the tapered outer peripheral face 70a such that the conical planetary roller 60 continuously maintains the engagement with the ring roller 58 and the sun roller 64 while moving along the center axis R1. The top ridge line on the tapered outer peripheral face 72a is defined as a group of radially outermost positions of the tapered outer peripheral face 72a along the center axis R1. The bottom ridge line on the tapered outer peripheral face 70a is defined as a group of radially innermost positions of the tapered outer peripheral face 70a along the center axis R1.

The tapered outer peripheral face 70a of the first frictional engagement portion 70 frictionally engages with the tapered outer peripheral face 64a of the sun roller 64. In the illustrated embodiment, the tapered outer peripheral face 70a contacts with the tapered outer peripheral face 64a such that the tapered outer peripheral face 70a has a first effective diameter D1 at a first contact point established between the tapered outer peripheral face 70a and the tapered outer peripheral face 64a. The first frictional engagement portion 70 is oriented such that an intersection of the tapered outer peripheral face 70a with a first plane including the center axis R1 of the hub shaft 26 and the rotational axis R3 of the conical planetary roller 60 substantially extends along an intersection of the tapered outer peripheral face 64a with this first plane. The tapered outer peripheral face 72a of the second frictional engagement portion 72 frictionally engages with the ring roller 58. Specifically, the tapered outer peripheral face 72a contacts with a tapered inner peripheral face 58a of the ring roller 58 such that the tapered outer peripheral face 72a has a second effective diameter D2 at a second contact point established between the tapered outer peripheral face 72a and the tapered inner peripheral face 58a. The second frictional engagement portion 72 is oriented such that an intersection of the tapered outer peripheral face 72a with the first plane including the center axis R1 of the hub shaft 26 and the rotational axis R3 of the first conical planetary roller 60 substantially extends along an intersection of the tapered inner peripheral face 58a with this first plane.

In the illustrated embodiment, as illustrated in FIGS. 3 to 5, the first effective diameter D1 of the first frictional engagement portion 70 of each of the conical planetary rollers 60 gradually increases as the roller carrier 62 with the conical planetary rollers 60 continuously moves from the first axial position (shown in FIG. 3) toward the second axial position (shown in FIG. 5). On the other hand, the second effective diameter D2 of the second frictional engagement portion 72 of each of the conical planetary rollers 60 gradually decreases as the roller carrier 62 with the conical planetary rollers 60 continuously moves from the first axial position (shown in FIG. 3) toward the second axial position (shown in FIG. 5). Thus, the ratio of the second effective diameter D2 with respect to the first effective diameter D1 gradually decreases as the roller carrier 62 with the conical planetary rollers 60 continuously moves from the first axial position (shown in FIG. 3) toward the second axial position (shown in FIG. 5), thereby continuously decreasing the gear ratio of the CVT unit 22 as the roller carrier 62 with the conical planetary rollers 60 continuously moves from the first axial position (shown in FIG. 3) toward the second axial position (shown in FIG. 5). In other words, in the illustrated embodiment, the roller carrier 62 moves in the first axial direction X1 during shifting down, while the roller carrier 62 moves in the second axial direction X2 during shifting up.

Figure 8:
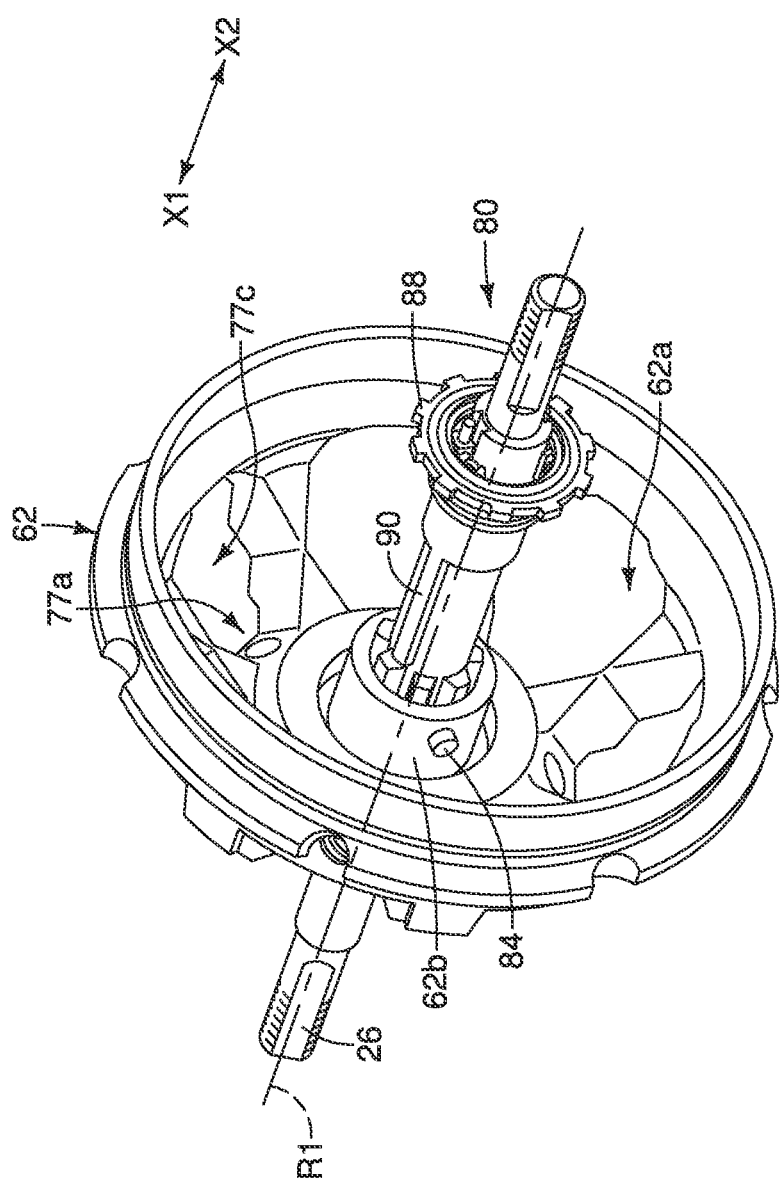
FIG. 8 is a perspective view of the roller carrier and a part of a varying mechanism of the continuously variable transmission unit illustrated in FIG. 3, with the roller carrier mounted to the hub axle of the hub assembly.

Referring to FIGS. 3 to 8, the configuration of the planetary roller carrier 62 will be discussed in detail. As illustrated in FIGS. 6 to 8, the roller carrier 62 is a cup-shaped member with a plurality of apertures in a peripheral face. In the illustrated embodiment, the roller carrier 62 has a plurality of (seven in the illustrated embodiment) roller attachment sections 62a and a center boss 62b. The roller carrier 62 is operatively supported to the hub shaft 26. In particular, the roller carrier 62 is non-rotatably mounted on the hub shaft 26, while the roller carrier 62 is slidable along the hub shaft 26. In the illustrated embodiment, the roller carrier 62 is slidably mounted to the hub shaft 26 via a bearing unit 68. The bearing unit 68 is disposed between the hub shaft 26 and the roller carrier 62 for axial movement of the roller carrier 62 relative to the hub shaft 26. Furthermore, the roller carrier 62 has axial spline grooves on an inner surface of the center boss 62b. The spline grooves of the roller carrier 62 engage with axial splines on the hub shaft 26. With this configuration, the roller carrier 62 is non-rotatably and slidably mounted to the hub shaft 26. In the illustrated embodiment, as seen in FIGS. 3 to 5, the hub assembly 12 has the bearing unit 68 with a plurality of balls. However, the bearing unit 68 can be different type of bearing units as needed or desired.

As illustrated in FIGS. 6 to 8, the roller attachment sections 62a are circumferentially arranged about a center axis of the roller carrier 62 with equal spacing. The conical planetary rollers 60 are rotatably supported to the roller attachment sections 62a of the roller carrier 62, respectively. In the illustrated embodiment, the roller carrier 62 rotatably supports both ends of the first and second roller axles 74 and 76 of each of the conical planetary rollers 60. Specifically, the roller carrier 62 rotatably supports the conical planetary rollers 60 such that each of the rotational axes R3 of the conical planetary rollers 60 is slanted relative to the center axis R1. In particular, each of the rotational axes R3 is slanted such that distances between the rotational axes R3 and the center axis R1 decrease along the first axial direction X1 of the center axis R1. As illustrated in FIGS. 3 to 5 and 7, each of the roller attachment sections 62a has inner and outer bearing portions 77a and 77b, and a roller receiving bore 77c. The inner bearing portion 77a is radially inwardly disposed relative to the outer bearing portion 77b with respect to the center axis R1. In the illustrated embodiment, the inner bearing portion 77a has a through hole extending in the rotational axis R3, while the outer bearing portion 77b has a groove with a semi-circular inner face extending in the rotational axis R3. The inner and outer bearing portions 77a and 77b rotatably support the first and second roller axles 74 and 76, respectively, such that the conical planetary roller 60 is rotatable relative to the roller carrier 62 about the rotational axis R3 defined by the first and second roller axles 74 and 76. In the illustrated embodiment, bushings or roller bearings are disposed about the first and second roller axles 74 and 76 between the inner and outer bearing portions 77a and 77b and the first and second roller axles 74 and 76 for smooth rotation of the conical planetary rollers 60. Furthermore, inner and outer retainer rings 78a and 78b with axle openings are attached to the roller carrier 62 to retain the first and second roller axles 74 and 76 relative to the inner and outer bearing portions 77a and 77b.

In the illustrated embodiment, the conical planetary rollers 60 are also axially slidable relative to the roller carrier 62 along the rotational axes R3, respectively. In particular, the conical planetary rollers 60 are configured to slide along the rotational axes R3, respectively, in response to the axial movement of the roller carrier 62 along the center axis R1. Specifically, the conical planetary rollers 60 slide along the rotational axes R3 such that the conical planetary rollers 60 radially inwardly moves relative to the center axis R1 while the roller carrier 62 moves from the first axial position towards the second axial position. On the other hand, the conical planetary rollers 60 slide along the rotational axes R3 such that the conical planetary rollers 60 radially outwardly moves relative to the center axis R1 while the roller carrier 62 moves from the second axial position towards the first axial position. The conical planetary rollers 60 are biased towards the outer bearing portions 77b along the rotational axes R3, respectively. In the illustrated embodiment, compression springs are disposed about the first roller axles 74 to bias the conical planetary rollers 60 towards the outer bearing portions 77b. Alternatively, the CVT unit 22 can be configured without having the compression springs in the CVT unit 22.

As shown in FIGS. 3 to 5, the ring roller 58 is operatively supported to the hub shaft 26. In particular, the ring roller 58 is rotatable around the hub shaft 26. The ring roller 58 is frictionally engaged with the conical planetary rollers 60. In the illustrated embodiment, the ring roller 58 is generally a ring member. The ring roller 58 is frictionally engaged with the second frictional engagement portions 72 of the conical planetary rollers 60. In particular, the tapered inner peripheral face 58a of the ring roller 58 is frictionally engaged with the tapered outer peripheral faces 72a. The tapered inner peripheral face 58a is configured and arranged such that the inner diameter of the tapered inner peripheral face 58a decreases along the first axial direction X1 of the hub shaft 26. The tapered inner peripheral face 58a has no gear teeth. In the illustrated embodiment, the ring roller 58 is connected to the output ring 48 via the one-way clutch mechanism 46. The one-way clutch mechanism 46 is a conventional one-way clutch, and transmits the rotational power from the ring roller 58 to the output ring 48 only in the forward rotational direction about the center axis R1. In the illustrated embodiment, the output ring 48 is non-rotatably coupled to the hub shell 30. Thus, the rotational power from the ring roller 58 in the forward rotational direction about the center axis R1 is transmitted to the hub shell 30 via the one-way clutch mechanism 46 and the output ring 48.

Figure 9:
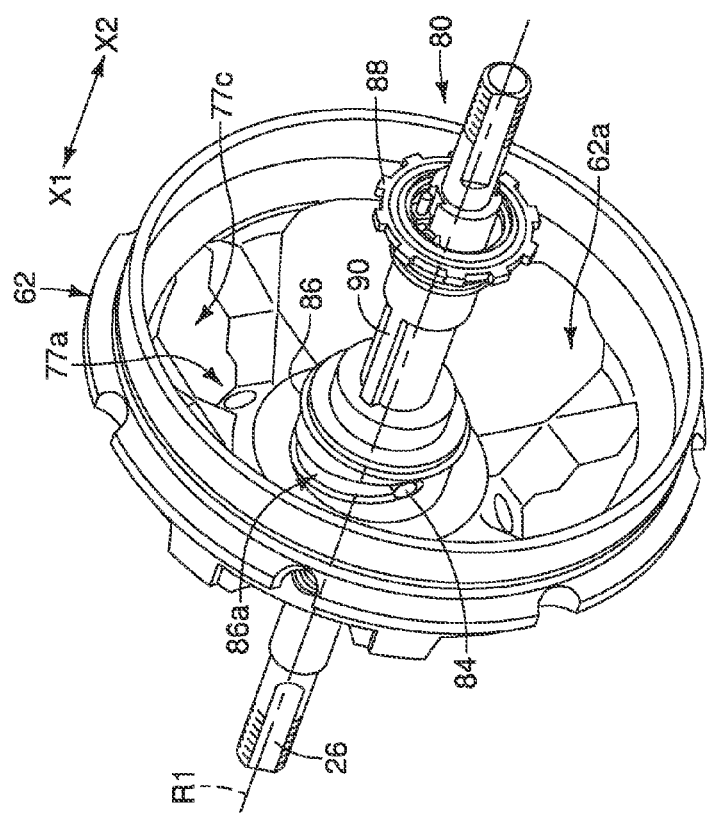
FIG. 9 is a perspective view of the roller carrier and the varying mechanism of the continuously variable transmission unit illustrated in FIG. 3, the roller carrier coupled to the varying mechanism for axial movement, the roller carrier axially positioned at the top gear position to establish the top gear ratio of the hub assembly.
Figure 11:
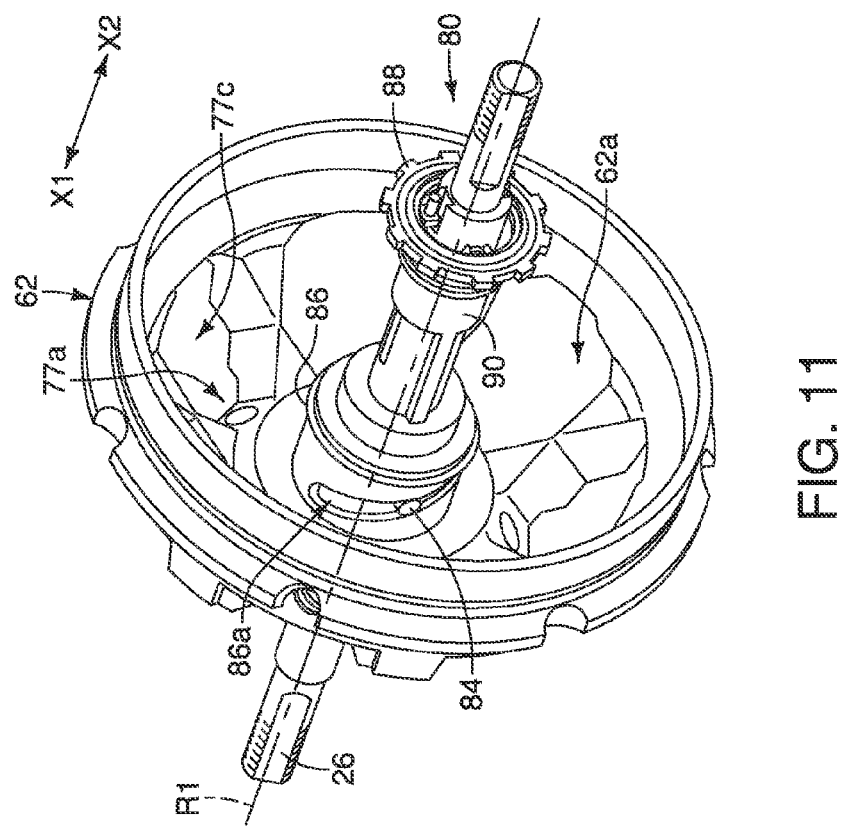
FIG. 11 is a perspective view of the roller carrier and the varying mechanism of the continuously variable transmission unit illustrated in FIG. 3, the roller carrier axially positioned at the middle gear position to establish the middle gear ratio of the hub assembly.
Figure 13:
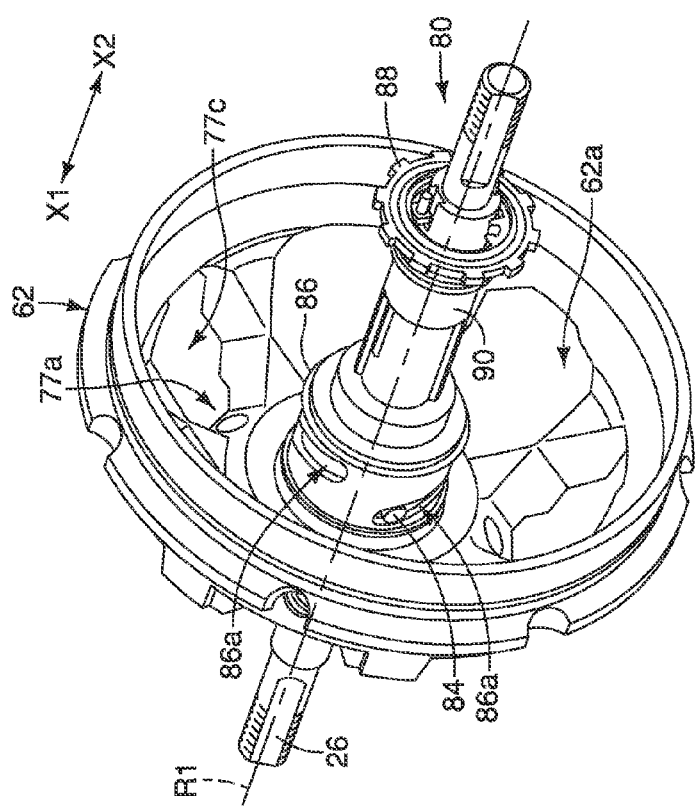
FIG. 13 is a perspective view of the roller carrier and the varying mechanism of the continuously variable transmission unit illustrated in FIG. 3, the roller carrier axially positioned at the low gear position to establish the low gear ratio of the hub assembly.

As illustrated in FIGS. 3 to 5, the hub assembly 12 has a varying mechanism 80. The varying mechanism 80 transforms a rotational movement about the center axis R1 to an axial movement along the center axis R1 for changing the axial position of the roller carrier 62. In the illustrated embodiment, the varying mechanism 80 is operatively coupled to the roller carrier 62 such that the varying mechanism 80 changes the axial position of the roller carrier 62 between the first axial position (shown in FIG. 3) and the second axial position (shown in FIG. 5) via the middle axial position (shown in FIG. 4) along the center axis R1. Specifically, the varying mechanism 80 continuously changes the axial position of the roller carrier 62 between the first and second axial positions. In the illustrated embodiment, the varying mechanism 80 includes a pair of cam pins 84 (only one is shown in FIG. 8) and a cam member or transmission sleeve 86. The cam pins 84 extend radially from the roller carrier 62. In particular, as seen in FIG. 8, the cam pins 84 are fixedly coupled to attachment holes in an outer peripheral face of the center boss 62b of the roller carrier 62, respectively. The cam pins 84 are arranged 180 degrees away from each other along the outer peripheral face of the center boss 62b of the roller carrier 62. As seen in FIGS. 9, 11 and 13, the cam member 86 is rotatably disposed about the center axis R1. Specifically, the cam member 86 is rotatably disposed on the outer peripheral face of the center boss 62b of the roller carrier 62, while the cam member 86 is stationary relative to the hub shaft 26 in the axial direction of the hub shaft 26. The cam member 86 is arranged relative to the roller carrier 62 such that the roller carrier 62 is slidable with respect to the cam member 86. As seen in FIGS. 9, 11 and 13, in the illustrated embodiment, the cam member 86 has a pair of spiral cam openings or slots 86a. The cam pins 84 are disposed in the spiral cam openings 86a such that the cam pins 84 moves along the spiral cam openings 86a while the cam member 86 rotates around the hub shaft 26. Specifically, the spiral cam openings 86a extend spirally along a cylindrical portion of the cam member 86. In particular, the spiral cam opening 86a extend from circumferential locations on the cylindrical portion of the cam member 86 that are 180 degrees away from each other. The spiral cam openings 86a extend both in the forward rotational direction about the center axis R1 and the first axial direction X1 along the center axis R1. The spiral cam openings 86a extend in the forward rotational direction of the cylindrical portion of the cam member 86 by 120 degrees. The cam member 86 is rotatable and slidable relative to the center boss 62b of the roller carrier 62. Thus, in response to the rotational movement of the cam member 86 in the reverse rotational direction about the center axis R1, the cam pins 84 are pushed in the first axial direction X1 by inner surfaces of the spiral cam openings 86a, respectively, thereby moving the roller carrier 62 in the first axial direction X1. On the other hand, in response to the rotational movement of the cam member 86 in the forward rotational direction about the center axis R1, the cam pins 84 are pushed in the second axial direction X2 by the inner surfaces of the spiral cam openings 86a, respectively, thereby moving the roller carrier 62 in the second axial direction X2.

As seen in FIGS. 8, 9, 11 and 13, in the illustrated embodiment, the varying mechanism 80 further includes an actuator 88 and a sleeve 90. The actuator 88 is rotatably disposed about the center axis R1. Specifically the actuator 88 is rotatably disposed on the hub shaft 26. The actuator 88 is actuated by the cable 21. In the illustrated embodiment, the actuator 88 is rotatably coupled to the hub shaft 26. The actuator 88 is operatively coupled to the cable 21 that is connected to the gear shifter in a conventional manner. Since coupling between the actuator 88 and the cable 21 is conventional, description is omitted for the sake of brevity. Thus, in response to the operation of the gear shifter, the cable 21 is pulled or released, thereby rotating the actuator 88 about the center axis R1 (i.e., the forward and reverse rotational directions about the center axis R1). The sleeve 90 is disposed between the actuator 88 and the cam member 86 such that the sleeve 90 transmits an actuation force from the actuator 88 to the cam member 86. In particular, the sleeve 90 axially extends between the actuator 88 and the cam member 86. One axial end of the sleeve 90 is non-rotatably coupled to the actuator 88, while the other axial end of the sleeve 90 is non-rotatable coupled to the cam member 86. Thus, if the actuator 88 is rotated by operating the gear shifter, then the cam member 86 is rotated via the sleeve 90. The sleeve 90 is disposed about the hub shaft 26. The sleeve 90 has cut-off portions on a peripheral portion of the sleeve 90. The cut-off portions receive attachment portions of an inner ring of the bearing assembly 38c and the upstream planetary gear carrier 56 relative to the hub shaft 26 therewithin. Thus, the peripheral portion of the sleeve 90 is prevented from contacting with the attachment portions of the inner ring of the bearing assembly 38c and the upstream planetary gear carrier 56 while rotating the sleeve 90 within a predetermined rotational range about the center axis R1.

Figure 10:
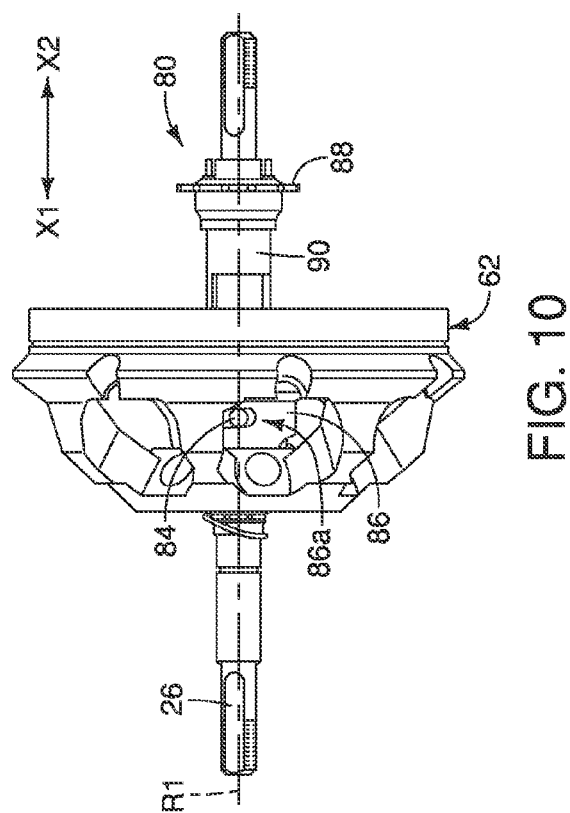
FIG. 10 is a front elevational view of the roller carrier and the varying mechanism of the continuously variable transmission unit illustrated in FIG. 3, the roller carrier axially positioned at the top gear position to establish the top gear ratio of the hub assembly.
Figure 12:
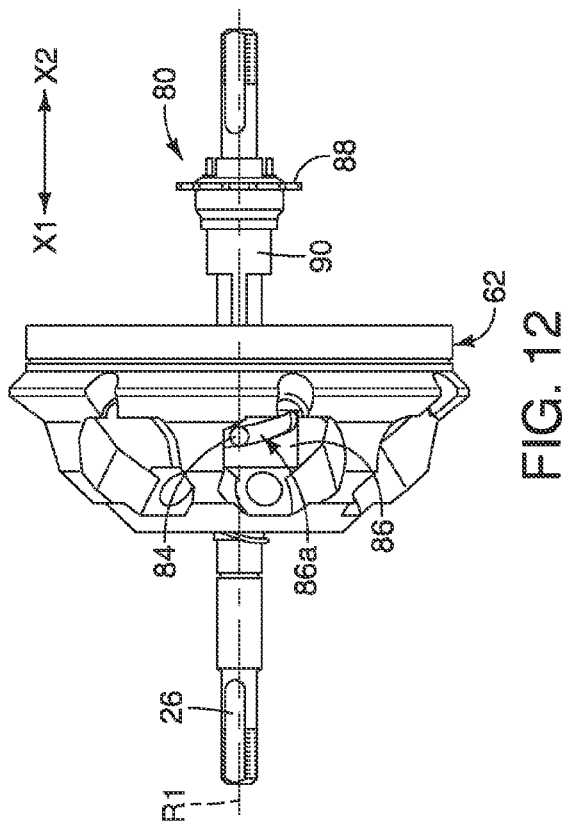
FIG. 12 is a front elevational view of the roller carrier and the varying mechanism of the continuously variable transmission unit illustrated in FIG. 3, the roller carrier axially positioned at the middle gear position to establish the middle gear ratio of the hub assembly.
Figure 14:
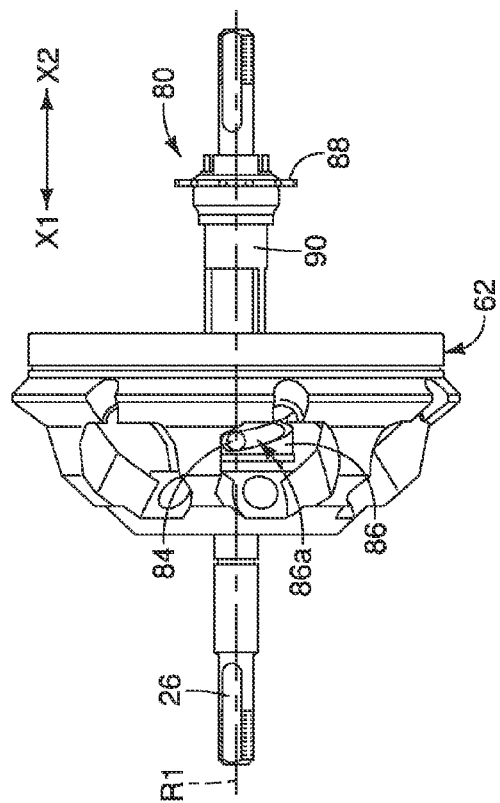
FIG. 14 is a front elevational view of the roller carrier and the varying mechanism of the continuously variable transmission unit illustrated in FIG. 3, the roller carrier axially positioned at the low gear position to establish the low gear ratio of the hub assembly.

As illustrated in FIGS. 9-14, the varying mechanism 80 changes the axial position of the roller carrier 62 by rotating the cam member 86 relative to the hub shaft 26. In the illustrated embodiment, the cam member 86 is rotatable within the predetermined rotational range between a first rotational position (shown in FIGS. 9 and 10) and a second rotational position (shown in FIGS. 13 and 14) via a middle rotational position (shown in FIGS. 11 and 12) about the center axis R1. In the illustrated embodiment, the first rotational position as shown in FIGS. 9 and 10 is 120 degrees away from the second rotational position as shown in FIGS. 13 and 14 in the forward rotational direction about the center axis R1. Furthermore, the first rotational position as shown in FIGS. 9 and 10 is 60 degrees away from the middle rotational position as shown in FIGS. 11 and 12 in the forward rotational direction about the center axis R1. In other words, the cam member 86 is rotated in the reverse rotational direction about the center axis R1 from the first rotational position towards the middle and second rotational positions, as illustrated in FIGS. 9-14. In the illustrated embodiment, the first rotational position is configured to be 120 degrees away from the second rotational position in the forward rotational direction about the center axis R1, and 60 degrees away from the middle rotational position in the forward rotational direction about the center axis R1. However, these values or directions can be different value and directions as desired or needed.

In the illustrated embodiment, when the cam member 86 is in the first rotational position as shown in FIGS. 9 and 10, the cam pins 84 are located at first circumferential ends of the spiral cam openings 86a in the reverse rotational direction about the center axis R1, respectively. In this case, the roller carrier 62 is located at the first axial position as shown in FIG. 3. When the cam member 86 is in the second rotational position as shown in FIGS. 13 and 14, the cam pins 84 are located at second circumferential ends of the spiral cam openings 86a in the forward rotational direction about the center axis R1, respectively. In this case, the roller carrier 62 is located at the second axial position as shown in FIG. 5. Furthermore, when the cam member 86 is in the middle rotational position as shown in FIGS. 11 and 12, the cam pins 84 are located at middle circumferential positions of the spiral cam openings 86a between the first and second circumferential ends, respectively. In this case, the roller carrier 62 is located at the middle axial position as shown in FIG. 4.

In the illustrated embodiment, the varying mechanism 80 transforms the rotational movement of the actuator 88 to the axial movement of the roller carrier 62. However, the hub assembly 12 can include different type of varying or shifting mechanism. For example, the roller carrier 62 can be operated by a push rod and a conventional bell crank that is swingably coupled to the hub shaft 26. In this case, in response to cyclist shifting actions, the bell crank moves the push rod along the center axis R1, thereby sliding the roller carrier 62 along the center axis R1.

Referring now to FIGS. 3 to 5 and 9 to 14, the power transmission path of the hub assembly 12 will be discussed in detail. First, the rear chain sprocket 24 receives the rotational power from the front chain sprocket 18 via the chain 20. The rotational power rotates the rear chain sprocket 24 in the forward rotational direction about the center axis R1, which also rotates the driver 28 in the forward rotational direction. The driver 28 is coupled to the upstream ring gear 54 of the upstream planetary gear unit 32 via the one-way clutch mechanism 44. The upstream planetary gear unit 32 is arranged to receive the rotational power from the driver 28 in the forward rotational direction. In the illustrated embodiment, the upstream ring gear 54 of the upstream planetary gear unit 32 receives the rotational power from the driver 28 as a rotational input, and transmits the rotational power to the upstream sun gear 50 via the upstream planetary gears 52. The upstream planetary gear unit 32 is configured as a speed change gear that reverses the rotational direction of the rotational input and increases the speed. In other words, the upstream planetary gear unit 32 increases an input rotational speed of the upstream ring gear 54, but reverses an input rotational direction (i.e., forward rotational direction) of the upstream ring gear 54. As a result, the upstream sun gear 50 rotates in the reverse rotational direction about the center axis R1, which also rotates the sun roller 64 of the CVT unit 22 in the reverse rotational direction.

The CVT unit 22 receives the rotational power from the sun roller 64 as a rotational input, and transmits the rotational power to the ring roller 58 via the conical planetary rollers 60. Specifically, the CVT unit 22 receives the rotational power from the sun roller 64 in the reverse rotational direction about the center axis R1, and transmits the rotational power to the ring roller 58 such that the ring roller 58 rotates in the forward rotational direction about the center axis R1. In other words, the CVT unit 22 reverses an input rotational direction (i.e., reverse rotational direction) of the sun roller 58. In the illustrated embodiment, each of the first frictional engagement portions 70 of the conical planetary rollers 60 receives the rotational power from the sun roller 64 as a rotational input. Then, each of the second frictional engagement portions 72 of the conical planetary rollers 60 transmits the rotational power to the ring roller 58. As a result, the ring roller 58 rotates in the forward rotational direction about the center axis R1, which rotates the hub shell 30 in the forward rotational direction about the center axis R1 via the one-way clutch mechanism 46 and the output ring 48.

In the illustrated embodiment, the ring roller 58 rotates at a rotational speed according to the axial position of the roller carrier 62 with conical planetary rollers 60 with respect to the sun roller 64 and the ring roller 58. In the illustrated embodiment, as illustrated in FIGS. 3 to 5, the varying mechanism 80 continuously changes the axial position of the roller carrier 62 between the first axial position (shown in FIG. 3) and the second axial position (shown in FIG. 5) via the middle axial position (shown in FIG. 4) along the center axis R1 of the hub shaft 26.

In the illustrated embodiment, when the actuator 88 is operated such that the cam member 86 positions at the first rotational position as shown in FIGS. 9 and 10, the roller carrier 62 is positioned at the first axial position as shown in FIG. 3. The first axial position corresponds to a top gear position of the CVT unit 22 that establishes the highest gear ratio of the hub assembly 12. In particular, as illustrated in FIG. 3, when the roller carrier 62 is positioned at the first axial position, the first effective diameter D1 becomes the smallest diameter while the second effective diameter D2 becomes the largest diameter, which causes the highest gear ratio of the CVT unit 22 and the hub assembly 12. In the illustrated embodiment, the highest or top gear ratio of the hub assembly 12 is adjusted to 1.719. Of course, this highest gear ratio can be set to a different value as needed or desired by designing the configurations of the upstream planetary gear unit 32 and the CVT unit 22.

Furthermore, in the illustrated embodiment, when the actuator 88 is operated such that the cam member 86 positions at the middle rotational position as shown in FIGS. 11 and 12, the roller carrier 62 is positioned at the middle axial position as shown in FIG. 4. The middle axial position corresponds to a middle gear position of the CVT unit 22 that establishes a middle or neutral gear ratio of the hub assembly 12. In particular, as illustrated in FIG. 4, when the roller carrier 62 is positioned at the middle axial position, the first effective diameter D1 becomes a middle diameter between the smallest diameter and the largest diameter while the second effective diameter D2 also becomes a middle diameter between the smallest diameter and the largest diameter, which causes the middle gear ratio of the CVT unit 22 and the hub assembly 12. In the illustrated embodiment, the middle or neutral gear ratio of the hub assembly 12 is adjusted to 0.925. Of course, this middle gear ratio can be set to a different value as needed or desired by designing the configurations of the upstream planetary gear unit 32 and the CVT unit 22.

Moreover, in the illustrated embodiment, when the actuator 88 is operated such that the cam member 86 positions at the second rotational position as shown in FIGS. 13 and 14, the roller carrier 62 is positioned at the second axial position as shown in FIG. 5. The second axial position corresponds to a low gear position of the CVT unit 22 that establishes the lowest gear ratio of the hub assembly 12. In particular, as illustrated in FIG. 5, when the roller carrier 62 is positioned at the second axial position, the first effective diameter D1 becomes the largest diameter while the second effective diameter D2 becomes the smallest diameter, which causes the lowest gear ratio of the CVT unit 22 and the hub assembly 12. In the illustrated embodiment, the lowest gear ratio of the hub assembly 12 is adjusted to 0.475. Of course, this lowest gear ratio can be set to a different value as needed or desired by designing the configurations of the upstream planetary gear unit 32 and the CVT unit 22.

In the illustrated embodiment, the CVT unit 22 is disposed within the hub shell 30. However, the CVT unit 22 can be disposed any other places on the bicycle 10. In particular, the CVT unit 22 can be accommodated in a cylindrical hanger part of the frame 14 to which a front chain sprocket is attached.

In the illustrated embodiment, the upstream planetary gear unit 32 is disposed upstream of the power transmission path relative to the CVT unit 22. However, the upstream planetary gear unit 32 can be disposed at a different place in the power transmission path. For example, the upstream planetary gear unit 32 can be disposed downstream relative to the CVT unit 22. Furthermore, the upstream planetary gear unit 32 can be disposed any other places on the bicycle 10. In particular, the upstream gear unit 32 can also be accommodated in a cylindrical hanger part of the frame 14 to which a front chain sprocket is attached.

In the illustrated embodiment, with the upstream planetary gear unit 32, the upstream ring gear 54 receives the input rotation from the driver 28 while the upstream sun gear 50 outputs the output rotation to the CVT unit 22. Alternatively, the upstream sun gear 50 can receive the input rotation from the driver 28 while the upstream ring gear 54 can output the output rotation to the CVT unit 22. In this case, the upstream sun gear 50 can be connected to the driver 28 via a one-way clutch mechanism. Furthermore, the upstream ring gear 54 can be coupled to the sun roller 64 of the CVT unit 22.

In the illustrated embodiment, with the CVT unit 22, the sun roller 64 receives the input rotation from the upstream sun gear 50 of the upstream planetary gear unit 32 while the ring roller 58 outputs the output rotation to the hub shell 30. Alternatively, the ring roller 58 can receive the input rotation from the upstream planetary gear unit 32 while the sun roller 64 outputs the output rotation to the hub shell 30. In this case, the ring roller 58 can be coupled to the upstream sun gear 50. Furthermore, the sun roller 64 can be connected to the hub shell 30. Moreover, if the upstream ring gear 54 outputs the output rotation as mentioned above, then the ring roller 58 can be coupled to the upstream ring gear 54 to receive the input rotation from the upstream ring gear 54.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only a preferred embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the preferred embodiment according to the present invention are provided for illustration only, and not for the purpose of limiting the invention as defined by the appended claims and their equivalents.

What is claimed is:

1. A continuously variable bicycle transmission mechanism comprising:
    a ring roller;
    at least one conical planetary roller frictionally engaged with the ring roller, the at least one conical planetary roller being rotatable about a rotational axis of a roller axle of the at least one conical planetary roller;
    a sun roller frictionally engaged with the at least one conical planetary roller;
    a shaft defining an axis; and
    a carrier rotatably supporting both ends of the roller axle of the at least one conical planetary roller, the carrier being slidably provided on the shaft so as to be movable along the axis with the at least one conical planetary roller; a varying mechanism operatively coupled to the carrier such that the varying mechanism changes an axial position of the carrier between a first axial position and a second axial position along the axis; wherein the varying mechanism includes a camp pin that extends radially from the carrier, and a cam member that is rotatably disposed about the axis, the cam member having a spiral cam opening in which the cam pin is disposed such that the cam pin moves along the spiral cam opening while the cam member rotates about the axis.

2. The continuously variable bicycle transmission mechanism according to claim 1, further comprising
    a bearing unit disposed between the shaft and the carrier.

3. The continuously variable bicycle transmission mechanism according to claim 2, further comprising
    a drive member operatively coupled to the sun roller such that a driving force from the drive member is transmitted to the at least one conical planetary roller through the sun roller, and
    a driven member operatively coupled to the ring roller such that the driven member receives the driving force from the at least one conical planetary roller through the ring roller.

4. The continuously variable bicycle transmission mechanism according to claim 3, wherein
    the at least one conical planetary roller has first and second frictional engagement portions along the rotational axis of the roller axle, the first and second frictional engagement portions being frictionally engaged with the sun roller and the ring roller, respectively.

5. The continuously variable bicycle transmission mechanism according to claim 4, wherein
    the rotational axis of the roller axle is slanted relative to the axis.

6. The continuously variable bicycle transmission mechanism according to claim 4, wherein
    the varying mechanism further includes
        an actuator that is rotatably disposed about the axis, the actuator being actuated by a control cable, and
        a sleeve that is disposed between the actuator and the cam member such that the sleeve transmits an actuation force from the actuator to the cam member.

7. The continuously variable bicycle transmission mechanism according to claim 1, further comprising
    a drive member operatively coupled to the sun roller such that a driving force from the drive member is transmitted to the at least one conical planetary roller through the sun roller, and
    a driven member operatively coupled to the ring roller such that the driven member receives the driving force from the at least one conical planetary roller through the ring roller.

8. The continuously variable bicycle transmission mechanism according to claim 7, wherein
    the at least one conical planetary roller has first and second frictional engagement portions along the rotational axis of the roller axle, the first and second frictional engagement portions being frictionally engaged with the sun roller and the ring roller, respectively.

9. The continuously variable bicycle transmission mechanism according to claim 8, wherein
    the rotational axis of the roller axle is slanted relative to the axis.

10. The continuously variable bicycle transmission mechanism according to claim 8, wherein
    the varying mechanism further includes
        an actuator that is rotatably disposed about the axis, the actuator being actuated by a control cable, and
        a sleeve that is disposed between the actuator and the cam member such that the sleeve transmits an actuation force from the actuator to the cam member.

11. The continuously variable bicycle transmission mechanism according to claim 1, wherein
    the at least one conical planetary roller has first and second frictional engagement portions along the rotational axis of the roller axle, the first and second frictional engagement portions being frictionally engaged with the sun roller and the ring roller, respectively.

12. The continuously variable bicycle transmission mechanism according to claim 11, wherein
    the rotational axis of the roller axle is slanted relative to the axis.

13. The continuously variable bicycle transmission mechanism according to claim 11, wherein
the varying mechanism further includes
an actuator that is rotatably disposed about the axis, the actuator being actuated by a control cable, and
a sleeve that is disposed between the actuator and the cam member such that the sleeve transmits an actuation force from the actuator to the cam member.

14. The continuously variable bicycle transmission mechanism according to claim 1, wherein
the varying mechanism further includes
an actuator that is rotatably disposed about the axis, the actuator being actuated by a control cable, and
a sleeve that is disposed between the actuator and the cam member such that the sleeve transmits an actuation force from the actuator to the cam member.

15. A bicycle hub comprising:
a drive member;
a driven member;
a one-way clutch mechanism disposed in a power transmission path between the drive member and the driven member; and
a continuously variable transmission mechanism disposed in the power transmission path between the drive member and the driven member, the continuously variable transmission mechanism having
a ring roller,
at least one conical planetary roller frictionally engaged with the ring roller,
a sun roller frictionally engaged with the at least one conical planetary roller, and
a carrier rotatably supporting the at least one conical planetary roller, the carrier being movable along a hub axis with the at least one conical planetary roller; a varying mechanism operatively coupled to the carrier such that the varying mechanism changes an axial position of the carrier between a first axial position and a second axial position along the hub axis;
wherein the varying mechanism includes a cam pin that extends radially from the carrier, and a cam member that is rotatably disposed on the hub shaft defining the hub axis, the cam member having a spiral cam opening in which the cam pin is disposed such that the cam pin moves along the spiral cam opening while the cam member rotates around the hub shaft.

16. The bicycle hub according to claim 15, further comprising
a hub shaft defining the hub axis,
the carrier being slidable along the hub shaft.

17. The continuously variable bicycle transmission mechanism according to claim 16, further comprising
a bearing unit disposed between the shaft and the carrier.

18. The bicycle hub according to claim 16, wherein
the carrier rotatably supports both ends of a roller axle of the at least one conical planetary roller, with the roller axle defining a rotational axis of the at least one conical planetary roller.

19. The bicycle hub according to claim 18, wherein
the drive member is operatively coupled to the sun roller such that a driving force from the drive member is transmitted to the at least one conical planetary roller through the sun roller, and
the driven member is operatively coupled to the ring roller such that the driven member receives the driving force from the at least one conical planetary roller through the ring roller.

20. The bicycle hub according to claim 19, wherein
the at least one conical planetary roller has first and second frictional engagement portions along a rotational axis of a roller axle of the at least one conical planetary roller, the first and second frictional engagement portions being frictionally engaged with the sun roller and the ring roller, respectively.

21. The bicycle hub according to claim 20, wherein
the rotational axis of the roller axle is slanted relative to the hub axis.

22. The bicycle hub according to claim 19, wherein
the varying mechanism further includes
an actuator that is rotatably disposed on the hub shaft, the actuator being actuated by a control cable, and
a sleeve that is disposed between the actuator and the cam member such that the sleeve transmits an actuation force from the actuator to the cam member.

23. The bicycle hub according to claim 19, further comprising
a planetary gear mechanism operatively disposed between the drive member and the driven member.

24. The bicycle hub according to claim 23, wherein
the planetary gear mechanism is operatively disposed between the drive member and the sun roller such that a driving force from the drive member is transmitted to the sun roller through the planetary gear mechanism.

25. The bicycle hub according to claim 24, wherein
the planetary gear mechanism includes
a ring gear that is operatively coupled to the drive member such that the ring gear receives the driving force from the drive member,
a planetary gear that is engaged with the ring gear,
a planetary gear carrier that is non-rotatably supported to a hub shaft defining the hub axis, the planetary gear carrier rotatably supporting the planetary gear, and
a sun gear that is operatively coupled to the planetary gear such that the sun gear transmits the driving force to the sun roller.

26. The bicycle hub according to claim 15, wherein
the carrier rotatably supports both ends of a roller axle of the at least one conical planetary roller, with the roller axle defining a rotational axis of the at least one conical planetary roller.

27. The bicycle huh according to claim 26, wherein
the drive member is operatively coupled to the sun roller such that a driving force from the drive member is transmitted to the at least one conical planetary roller through the sun roller, and
the driven member is operatively coupled to the ring roller such that the driven member receives the driving force from the at least one conical planetary roller through the ring roller.

28. The bicycle hub according to claim 27, wherein
the at least one conical planetary roller has first and second frictional engagement portions along a rotational axis of a roller axle of the at least one conical planetary roller, the first and second frictional engagement portions being frictionally engaged with the sun roller and the ring roller, respectively.

29. The bicycle hub according to claim 28, wherein
the rotational axis of the roller axle is slanted relative to the hub axis.

30. The bicycle hub according to claim 27, wherein
the varying mechanism further includes
an actuator that is rotatably disposed on the hub shaft, the actuator being actuated by a control cable, and a sleeve that is disposed between the actuator and the cam member such that the sleeve transmits an actuation force from the actuator to the cam member.

31. The bicycle hub according to claim 27, further comprising
a planetary gear mechanism operatively disposed between the drive member and the driven member.

32. The bicycle hub according to claim 31, wherein
the planetary gear mechanism is operatively disposed between the drive member and the sun roller such that a driving force from the drive member is transmitted to the sun roller through the planetary gear mechanism.

33. The bicycle hub according to claim 32, wherein
the planetary gear mechanism includes
 a ring gear that is operatively coupled to the drive member such that the ring gear receives the driving force from the drive member,
 a planetary gear that is engaged with the ring gear,
 a planetary gear carrier that is non-rotatably supported to a hub shaft defining the hub axis, the planetary gear carrier rotatably supporting the planetary gear, and
 a sun gear that is operatively coupled to the planetary gear such that the sun gear transmits the driving force to the sun roller.

34. The bicycle hub according to claim 15, wherein
the drive member is operatively coupled to the sun roller such that a driving force from the drive member is transmitted to the at least one conical planetary roller through the sun roller, and
the driven member is operatively coupled to the ring roller such that the driven member receives the driving force from the at least one conical planetary roller through the ring roller.

35. The bicycle hub according to claim 34, wherein
the at least one conical planetary roller has first and second frictional engagement portions along a rotational axis of a roller axle of the at least one conical planetary roller, the first and second frictional engagement portions being frictionally engaged with the sun roller and the ring roller, respectively.

36. The bicycle hub according to claim 35, wherein
the rotational axis of the roller axle is slanted relative to the hub axis.

37. The bicycle hub according to claim 35, wherein
the varying mechanism further includes
 an actuator that is rotatably disposed on the hub shaft, the actuator being actuated by a control cable, and
 a sleeve that is disposed between the actuator and the cam member such that the sleeve transmits an actuation force from the actuator to the cam member.

38. The bicycle hub according to claim 35, further comprising
a planetary gear mechanism operatively disposed between the drive member and the driven member.

39. The bicycle hub according to claim 38, wherein
the planetary gear mechanism is operatively disposed between the drive member and the sun roller such that a driving force from the drive member is transmitted to the sun roller through the planetary gear mechanism.

40. The bicycle hub according to claim 39, wherein
the planetary gear mechanism includes
 a ring gear that is operatively coupled to the drive member such that the ring gear receives the driving force from the drive member,
 a planetary gear that is engaged with the ring gear,
 a planetary gear carrier that is non-rotatably supported to a hub shaft defining the hub axis, the planetary gear carrier rotatably supporting the planetary gear, and
 a sun gear that is operatively coupled to the planetary gear such that the sun gear transmits the driving force to the sun roller.

41. The bicycle hub according to claim 15, wherein
the at least one conical planetary roller has first and second frictional engagement portions along a rotational axis of a roller axle of the at least one conical planetary roller, the first and second frictional engagement portions being frictionally engaged with the sun roller and the ring roller, respectively.

42. The bicycle hub according to claim 41, wherein
the rotational axis of the roller axle is slanted relative to the hub axis.

43. The bicycle hub according to claim 41, wherein
the varying mechanism further includes
 an actuator that is rotatably disposed on the hub shaft, the actuator being actuated by a control cable, and
 a sleeve that is disposed between the actuator and the cam member such that the sleeve transmits an actuation force from the actuator to the cam member.

44. The bicycle huh according to claim 41, further comprising
a planetary gear mechanism operatively disposed between the drive member and the driven member.

45. The bicycle hub according to claim 44, wherein
the planetary gear mechanism is operatively disposed between the drive member and the sun roller such that a driving force from the drive member is transmitted to the sun roller through the planetary gear mechanism.

46. The bicycle huh according to claim 45, wherein
the planetary gear mechanism includes
 a ring gear that is operatively coupled to the drive member such that the ring gear receives the driving force from the drive member,
 a planetary gear that is engaged with the ring gear,
 a planetary gear carrier that is non-rotatably supported to a hub shaft defining the hub axis, the planetary gear carrier rotatably supporting the planetary gear, and
 a sun gear that is operatively coupled to the planetary gear such that the sun gear transmits the driving force to the sun roller.

47. The bicycle hub according to claim 15, wherein
the varying mechanism further includes
 an actuator that is rotatably disposed on the hub shaft, the actuator being actuated by a control cable, and
 a sleeve that is disposed between the actuator and the cam member such that the sleeve transmits an actuation force from the actuator to the cam member.

48. The bicycle hub according to claim 15, further comprising
a planetary gear mechanism operatively disposed between the drive member and the driven member.

49. The bicycle hub according to claim 48, wherein
the planetary gear mechanism is operatively disposed between the drive member and the sun roller such that a driving force from the drive member is transmitted to the sun roller through the planetary gear mechanism.

50. The bicycle hub according to claim 49, wherein
the planetary gear mechanism includes
 a ring gear that is operatively coupled to the drive member such that the ring gear receives the driving force from the drive member,
 a planetary gear that is engaged with the ring gear, a planetary gear carrier that is non-rotatably supported to a hub shaft defining the hub axis, the planetary gear carrier rotatably supporting the planetary gear, and
a sun gear that is operatively coupled to the planetary gear such that the sun gear transmits the driving force to the sun roller.

\* \* \* \* \*